J. DE MARTINO.
POWER TRANSMITTING MECHANISM.
APPLICATION FILED JUNE 24, 1915.
1,310,114.
Patented July 15, 1919.
5 SHEETS—SHEET 5.
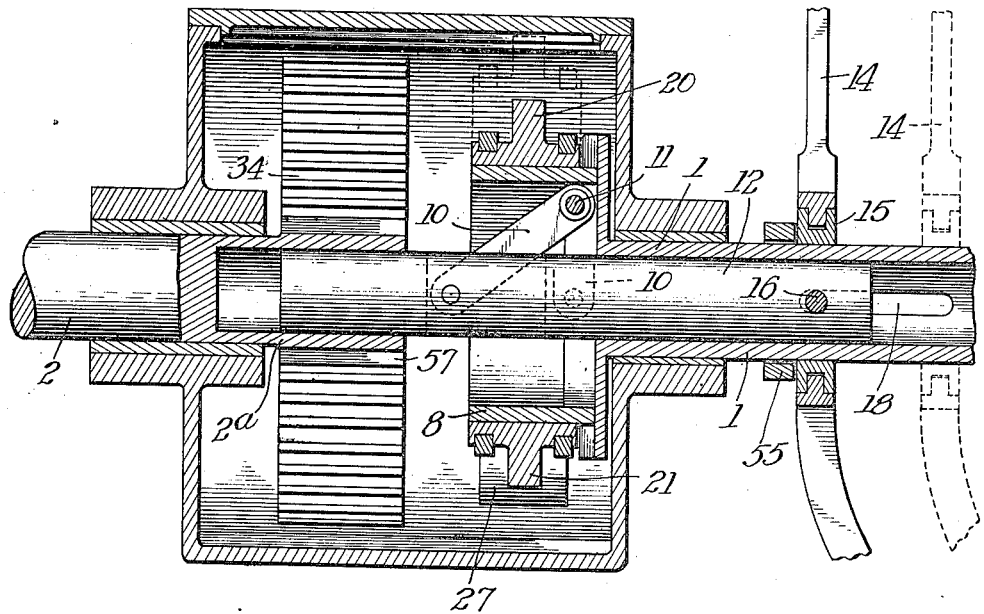
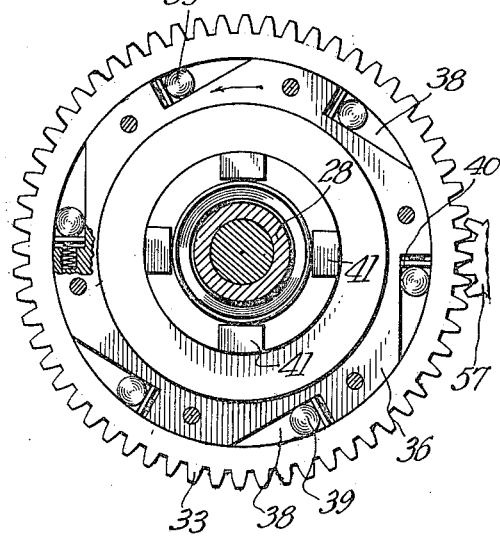
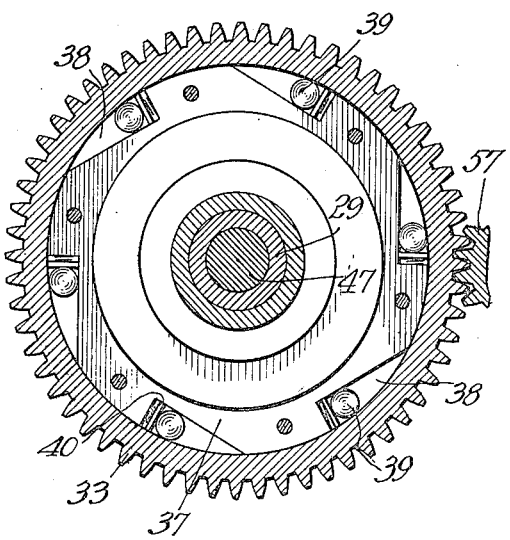
Witnesses:
Robert H. Weir
Arthur W. Capron
Inventor:
Joseph de Martino
By A. Miller Belfield atty.

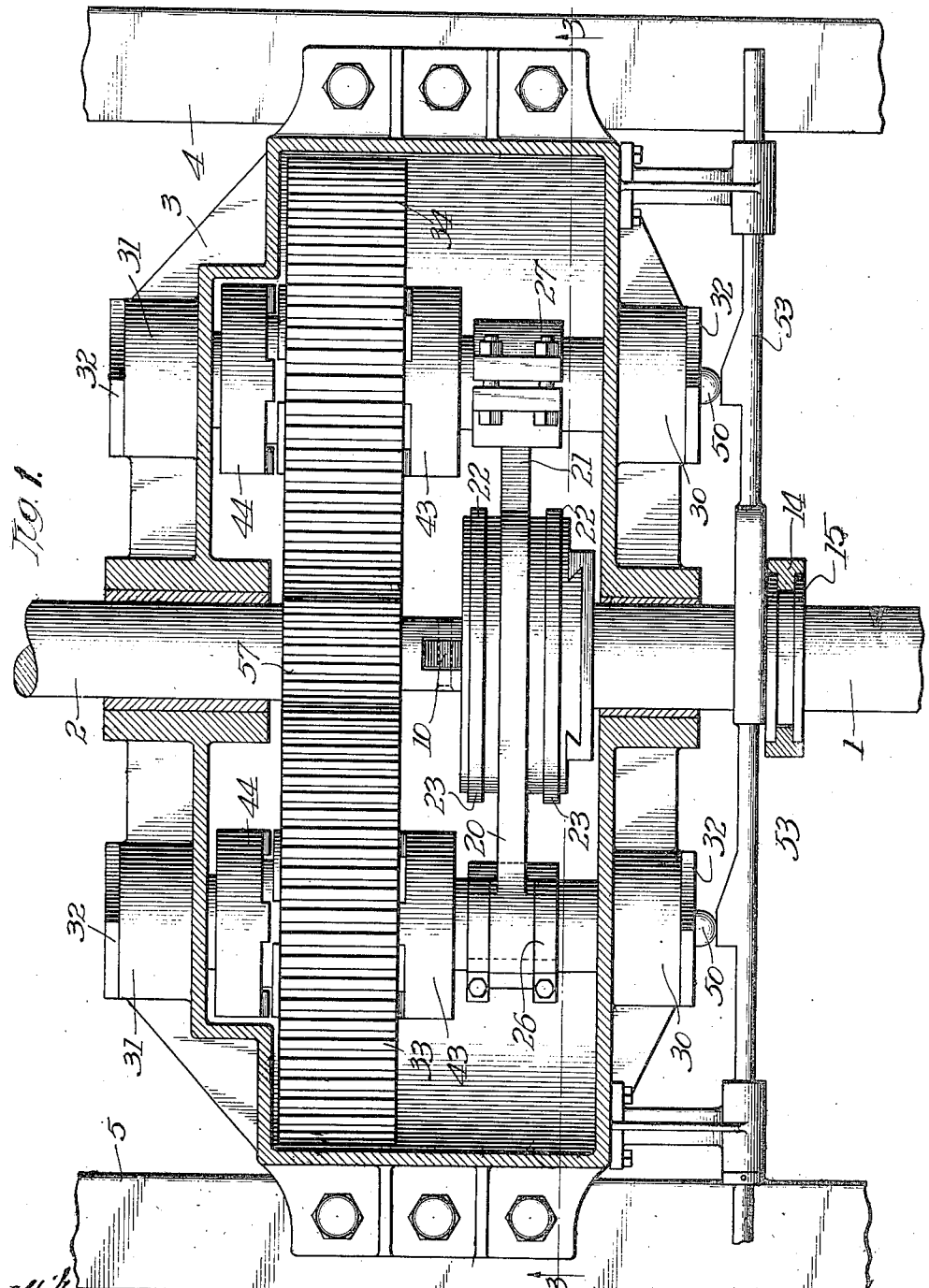

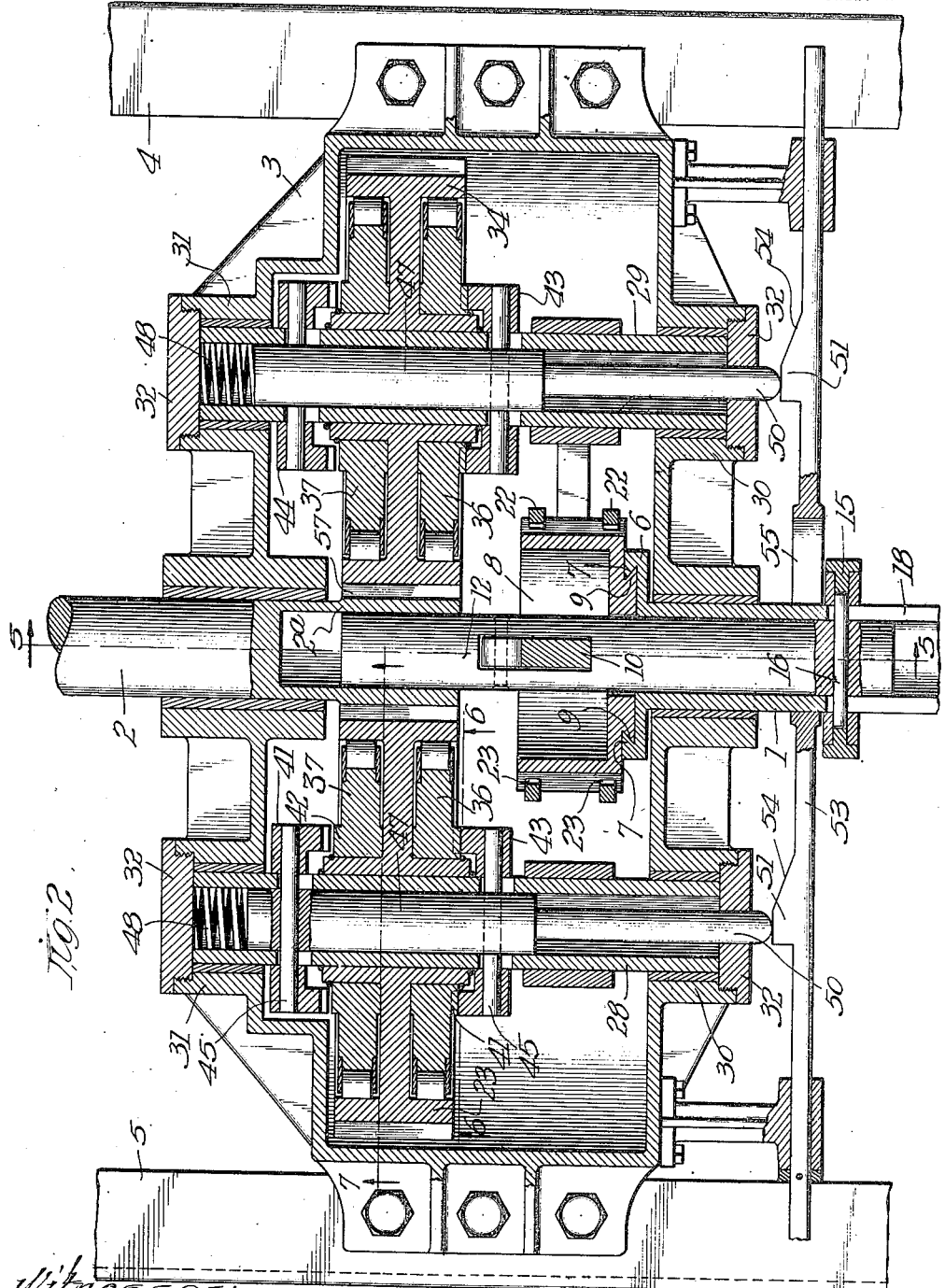

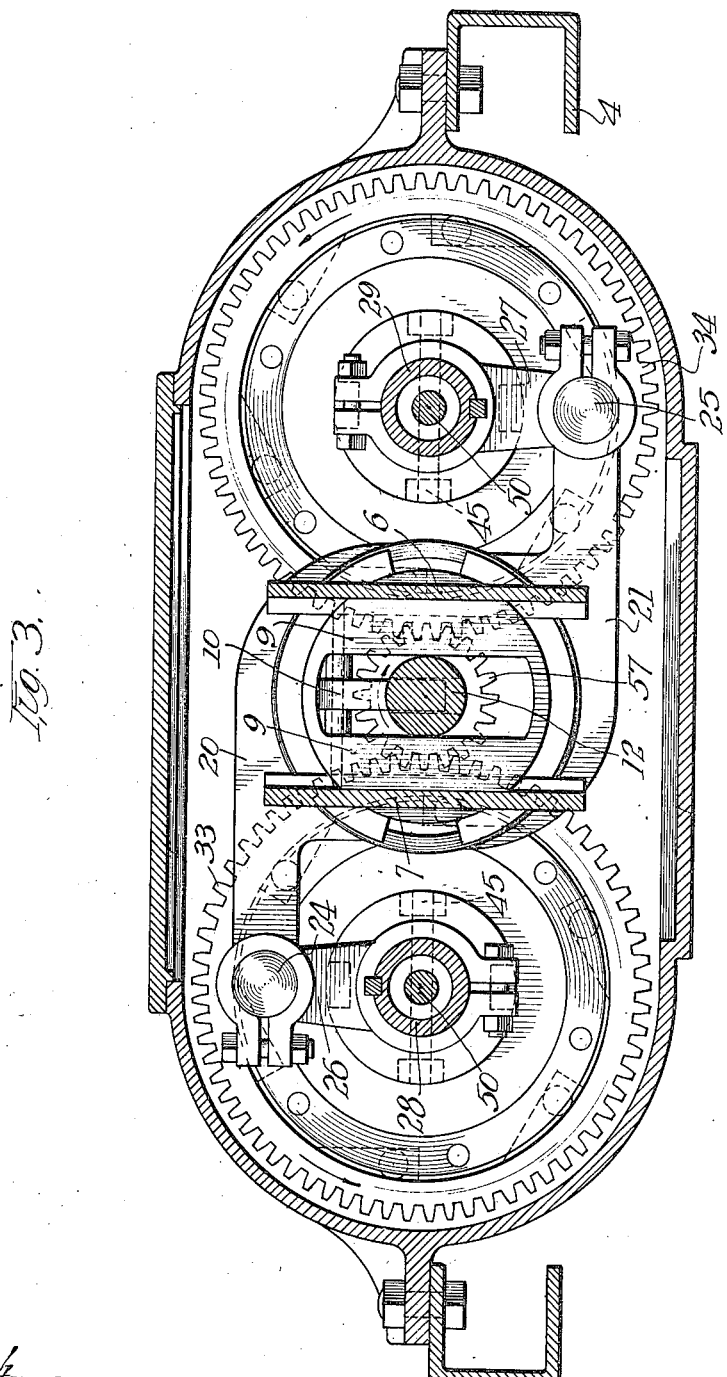

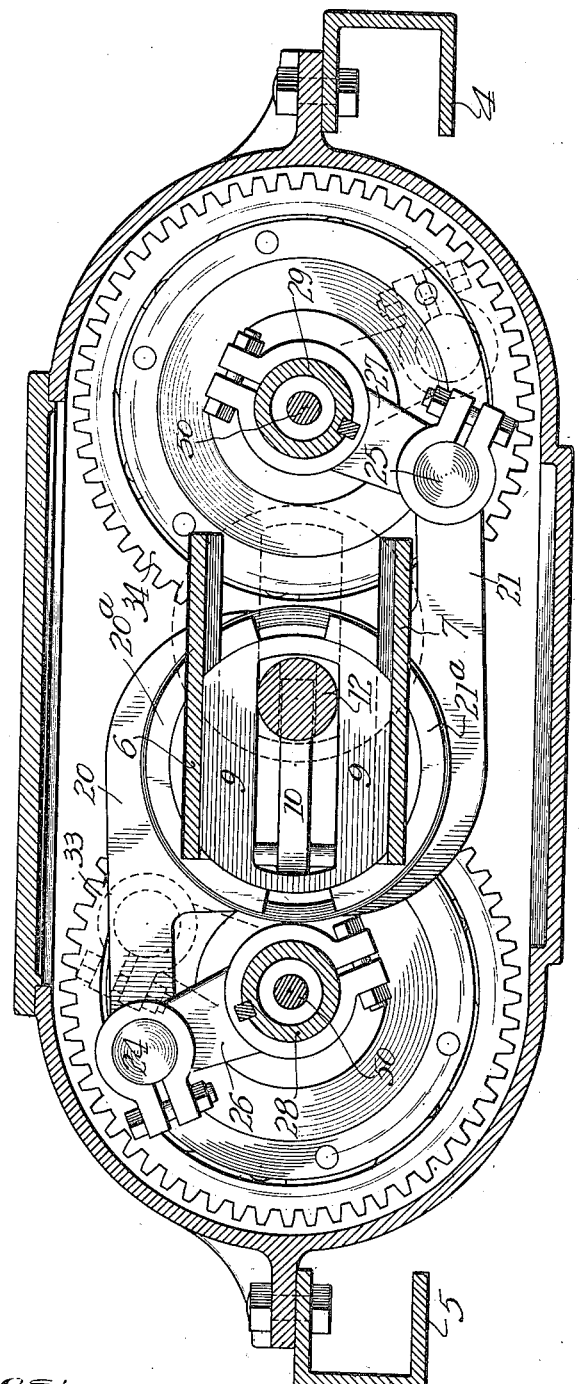

UNITED STATES PATENT OFFICE.

JOSEPH DE MARTINO, OF CHICAGO, ILLINOIS, ASSIGNOR TO MECHANICAL IMPROVEMENT COMPANY, OF CHICAGO, ILLINOIS, A CORPORATION OF ILLINOIS.

POWER-TRANSMITTING MECHANISM.

1,310,114.   Specification of Letters Patent.   Patented July 15, 1919.

Application filed June 24, 1915. Serial No. 36,017.

*To all whom it may concern:*

Be it known that I, JOSEPH DE MARTINO, a subject of the King of Italy, residing at Chicago, in the county of Cook and State of Illinois, have invented a certain new and useful Improvement in Power-Transmitting Mechanism, of which the following is a full, clear, concise, and exact description, reference being had to the accompanying drawings, forming a part of this specification.

My invention relates to power transmitting mechanism, and especially to a type of transmission especially adapted for use upon motor driven vehicles such as automobiles, power boats and the like.

The principal object of the invention is to provide a simple and practical type of power transmission which will permit a reversal of the direction of transmission and also changes in speed in going in either direction, without the necessity of throwing gears or similar devices into and out of mesh with one another.

A further object of the invention is to simplify the apparatus, reducing its number of parts, its size and the cost of construction. A further object is to simplify the method of controlling the transmission, reducing the number of levers or actuating instrumentalities by which reversal and changes in speed are obtained.

In the accompanying drawings Figure 1 is a plan view of a power transmitting apparatus embodying my present invention;

Fig. 2 is a longitudinal horizontal section of the same;

Fig. 3 is a longitudinal vertical section taken on line 3—3 in Fig. 1;

Fig. 4 is a view similar to Fig. 3, but with the apparatus in a different position due to operation;

Fig. 5 is a vertical section taken on line 5—5 in Fig. 2;

Figs. 6 and 7 are cross sections taken on lines 6—6 and 7—7 respectively in Fig. 2.

Referring first to Fig. 1, 1 designates a driving shaft, such for example as the engine shaft of an automobile or other device, driven for example by a gasolene engine, or other power generating unit, not shown. 2 designates a driven shaft which in the case of an automobile or power boat or the like may be a shaft running to the wheels or propellers or to some shaft by which the wheels or propellers are driven. Between these two shafts 1 and 2 is located the power transmitting mechanism containing my present invention. For convenience this mechanism is shown mounted in a suitable casing 3 preferably metallic and preferably closed so as to permit it to contain the grease to be used and also to prevent access of dust and dirt. This casing 3 is shown mounted upon two supporting members 4 and 5 which may be parts of the automobile or boat frame in case the mechanism is used in one of such devices. The driving shaft 1 is made hollow, as shown in Fig. 2 and is provided at its end with a cross plate or member 6 having guideways or strips 7. A drum 8 is located at the end of the shaft 1 and is provided with guideways or strips 9 adapted to coöperate with the guide strips 7 on the shaft head 6, so as to permit the drum 8 to slide transversely with reference to the shaft head 6. This arrangement causes the drum 8 to be rotated by the driving shaft 1, but permits said drum to be shifted transversely of the shaft so as to change the center of rotation of the drum relatively to the center of rotation of the shaft and thereby cause or permit the drum to be shifted to an eccentric position relative to the shaft 1 as well as to be placed in a position concentric therewith.

Means are provided for controlling the position of the drum 8 with reference to the shaft 1, the arrangement shown comprising a link 10 (Fig. 5) pivotally connected at 11 with the drum 8 and a slidable member 12 located in the hollow driving shaft 1 so that by shifting the member 12 longitudinally the link 10 will push or pull the drum 8 into any desired position from concentricity with the shaft 1 to the extreme eccentricity permitted as shown by dotted lines in Fig. 5. The member 12 is actuated by a lever 14 engaging a collar 15 carrying a pin 16 which passes through said slidable shaft or member 12 and is arranged to slide in slots 18 in the driving shaft 1. Thus a longitudinal movement of the member 12 may be obtained by shifting the lever 14, this shifting movement being permitted by the sliding of the pin 16 in the slots 18, and the rotation of the member 12 being permitted by the rotation of the collar 15 in its bearings in the lever 14. Thus any desired adjustment of the drum 8 may be secured by actuation of the lever 14. The slidable shaft section or member 12 is also preferably extended to and into the hollow end 2ª of the driven shaft 2, whereby said member 12 is properly supported at both ends.

The drum 8 is a driving instrumentality serving as a crank or eccentric and is connected with driving arms 20, 21 (Fig. 4) by which its motion may be employed for driving purposes as will be hereinafter explained. The arms 20 and 21 are provided with straps 20ª and 21ª respectively, which in part, but not entirely encircle the circumference or periphery of the drum 8, and rings 22—22 (Fig. 2) are mounted in grooves 23—23 in the straps 20ª and 21ª, whereby said straps are held in proper position upon the drum 8. The ends of the arms 20 and 21 are connected to crank ends 24 and 25 respectively which are in turn carried by crank arms 26 and 27 respectively. The crank arms 26 and 27 are mounted upon supplemental driving shafts 28 and 29 respectively which are mounted on opposite sides of the driving and driven shafts 1 and 2 and preferably parallel with the same, as shown in Fig. 2. These shafts 28 and 29 are conveniently mounted in bearings 30 and 31 formed in the casing 3, plug-like end members 32 being provided for said bearings. Thus it will be seen that when the drum 8 is adjusted so as to be eccentric to the driving shaft 1, the arms 20 and 21 will be given a reciprocable movement backward and forward thereby causing a rocking of the hollow shafts 28 and 29 by the swinging or rocking crank arms 26 and 27. This rocking movement is converted or translated into a continuous rotary motion by suitable mechanism, such for example as that now to be described. A pair of gears 33 and 34 are mounted upon the shafts 28 and 29, but are loose thereon so as to be able to turn freely upon said shafts. Each of said gears 33 and 34 is provided on its opposite sides with chambers or recesses which contain friction drive wheels 36 and 37 having peripheral angular shaped recesses 38 containing friction balls 39. The balls 39 are preferably backed by spring controlled or cushioned plates 40. The friction drive wheels 36 and 37 are also provided with clutch members 41 and 42 respectively, and these members are adapted to coöperate with clutch disks 43 and 44 mounted by means of pins 45 upon a shaft section or member 47 confined within each of the hollow shafts 28 and 29. Springs 48 are located in corresponding ends of the shafts 28 and 29 tending normally and continuously to push the slidable members 47 toward the other end of the hollow shafts containing them. Each of the members 47 is provided with an extension 50 which projects through the end member 32 and is adapted to coöperate with a projection or enlargement 51 on a slidable rod or bar 53, the rod or bar 53 having two members 51 for the two extensions 50, said members 51 having corresponding inclined surfaces 54. The rod or bar 53 also has a centrally arranged slot 55 by which it may straddle the driving shaft 1 and at the same time have the desired extent of longitudinal movement. Thus it will be seen that when the rod or bar 53 is shifted to the position shown in Fig. 2, the extensions 50 with their members 47 will be pushed longitudinally so as to disengage the clutches 44 from the friction drive wheels 37 and cause the engagement of the clutches 43 with the other friction drive wheels 36. Thus the wheels 36 will be in effect connected with the rock shafts 28 and 29 and the rocking movement imparted to said shafts will be in turn imparted through the friction wheels 36 to the gears 33 and 34. This will impart to the drive wheels 36 an intermittent impulse or advancing movement due to the friction balls 39 engaging the gears 33 and 34 during the forward thrusts of the arms 20 and 21, said wheels 36 returning to their original positions or in other words moving backwardly during their back strokes without frictional engagement between the balls 39 and gears 36 and 37. Thus the wheel 36 in the gear 33, for example, is given a forward impulse which is imparted to said gear 33 by frictional engagement of the balls 39 therein by the forward thrust of the arm 20 during the movement of said arm to the left, referring to Fig. 4 and then on the further rotation of the driving drum 8 and the movement of the arm 21 to the right, a similar impulse or advance movement will be imparted to the gear 34 because of frictional engagement of the balls 39 on the wheel 36 in said gear. Thus an advance thrust or impulse will be given to first one gear 33 and then the other 34, and then the first one 33 again, and so on. These two gears 33 and 34 are in mesh with an interposed pinion 57 which is carried by the driven shaft 2, being preferably made integral therewith. Thus the impulses given to the gears 33 and 34 are transmitted to the driven shaft 2 and coming one after the other in close succession a continuous rotation is imparted to this driven shaft 2.

In order to drive the driven shaft 2 in the opposite direction the rod or bar 53 is moved to the left (Fig. 2), so that the extensions 50 and the slidable members 47 move downwardly by reason of the springs 48 and the clutches 43 are thrown out of engagement with the wheels 36 and the clutches 44 into engagement with the wheels 37. The recesses 38 in the wheels 37 are cut in reverse direction with respect to the recesses in the wheels 36, as shown by a comparison of Figs. 6 and 7, so that the intermittent rocking motion of the shafts 28 and 29 imparts oppositely directioned impulses or movements to the wheels 37, thus driving the driven shaft 2 in an opposite direction. The rod or bar 53 may be mounted or arranged in any suitable manner so as to be accessible by a person operating the machine. Thus reversal of the direction of rotation of the driven shaft 2 and consequently reversal of direction of movement of an automobile or boat when the transmission is used in connection with the same, may be obtained by operation of the controlling rod or bar 53. Change in speed of rotation of the driven shaft 2, whether the same be driven in one direction or the other, may be obtained by the operating instrumentality 14, shifting the driving drum 8 to a more or less eccentric position, thereby changing the throw of the arms 20 and 21, and consequently changing the rocking action of the rock shafts 28 and 29. A period of concentricity of the drum 8 will of course produce no movement on the part of the arms 20 and 21, and consequently will allow the apparatus to be stopped although the engine or driving shaft 1 is still running.

It will be understood that changes and modifications may be made without departing from the spirit of the invention.

What I claim is:

1. The combination of a driving shaft, an eccentric mounted thereon, and means for adjusting said eccentric transversely of said driving shaft, said means comprising a link 10 pivotally connected to the eccentric member and a slidable member 12 located within said driving shaft and pivotally connected with the other end of said link 10.

2. The combination of a hollow driving shaft, an eccentric member mounted for transverse movement relatively to said driving shaft, a slidable member located within said hollow driving shaft and provided with mechanism whereby the longitudinal adjustment of said slidable member will vary the eccentricity of said eccentric member, a driven shaft in alinement with said driving shaft, said driven shaft having a socket adapted to receive the end portion of said slidable member, and transmitting mechanism between said eccentric member and said driven shaft.

3. The combination of a hollow driving shaft, an eccentric member mounted for transverse movement relatively to said driving shaft, a slidable member located within said hollow driving shaft and provided with mechanism whereby the longitudinal adjustment of said slidable member will vary the eccentricity of said eccentric member, a driven shaft in alinement with said driving shaft, said driven shaft having a socket adapted to receive the end portion of said slidable member, and transmitting mechanism between said eccentric member and said driven shaft, said transmitting mechanism comprising ratchet mechanism and reciprocating mechanism for actuating the same, said reciprocating mechanism being operated by said eccentric member and gearing actuated by said ratchet mechanism and in turn actuating said driven gear.

4. The combination of a hollow driving shaft, an eccentric member mounted for transverse movement relative to said driving shaft, a slidable member located within said hollow driving shaft and provided with mechanism whereby the longitudinal adjustment of said slidable member will vary the eccentricity of said eccentric member, a driven shaft in alinement with said driving shaft, said driven shaft having a socket adapted to receive the end portion of said slidable member and transmitting mechanism between said eccentric member and said driven shaft, said transmitting mechanism comprising ratchet mechanism and reciprocating mechanism for actuating the same, said reciprocating mechanism being operated by said eccentric member and gearing actuated by said ratchet mechanism and in turn actuating said driven gear, said gearing comprising two gears located on opposite sides of said driving shaft and meshing with said driven gear, and said ratchet mechanism consisting of two pairs of wheels, one pair in each of said gears, said wheels being provided with inclined surfaces and balls for frictionally engaging the rims of said gears, one of said wheels in each gear being adapted to rotate said gear in one direction and the other wheel therein being adapted to rotate it in the opposite direction, and means whereby either one or the other of said wheels may be actuated.

5. The combination of a rotary driving shaft provided with a transversely adjustable eccentric and transmission mechanism driven by said eccentric and comprising an arm oscillated by said eccentric, an oscillatory shaft actuated by said arm, a pair of oppositely-acting clutch-disks mounted on said oscillatory shaft, means for positively coupling either one of said clutch-disks to oscillate with said oscillatory shaft, a transmitting gear, and clutch-rollers interposed between said gear and clutch-disks, whereby said gear may be driven in either direction, depending upon which clutch-disk is coupled to said oscillatory shaft.

6. The combination of a containing case, a driving shaft entering one side of said case and supported thereby, a driven shaft entering the other side of said case and supported thereby, said driving and driven shafts being in alinement with one another, an eccentric member mounted upon said driving shaft within said case, means whereby the eccentricity of said eccentric member may be varied, said means extending outside of said case and being provided with an operating device outside of the case, said eccentric member actuating mechanism involving a longitudinally adjustable device, one end portion of which is contained in a recess in the driving shaft and another portion of which is contained in a recess in the driven shaft, and transmitting mechanism between the eccentric member and driven shaft for driving the latter.

7. The combination with a driving element of a driving member carried by said element and mounted for eccentric adjustment relatively thereto, transmitting connection driven by said member and containing a reciprocating mechanism operated by said eccentrically adjustable member, and two sets of ratchet-like mechanisms, one set adapted to drive in one direction and the other to drive in the other direction, a shiftable rod extending coaxially through said ratchet-like mechanisms and equipped with clutch mechanism for throwing either one or the other of said ratchet-like mechanisms into operation, and manually operable devices for shifting the eccentricity of said driving member and for controlling said rod.

8. The combination of a driving shaft, an eccentric member mounted thereon, said shaft being provided with guideways whereby said eccentric member may be shifted transversely of said shaft to vary its eccentricity, auxiliary shafts on opposites of said driving shaft, straps on said eccentric member, rocker arms mounted on said auxiliary shafts and connected with said straps, a pair of gears one mounted on each of said auxiliary shafts, said gears having side recesses in which are mounted friction wheels provided with inclined surfaces and friction balls, the latter being adapted to act upon the inner surfaces of the rims of said gears, one wheel in each gear being adapted to drive the gear in one direction and the other wheel therein, in the other direction, clutch members mounted on said auxiliary shafts on opposite sides of said gears and adapted to coöperate with said friction wheels, and means for actuating said clutch members to engage either one or the other of said wheels.

9. The combination of a driving shaft, a rotary driving drum carried by said shaft, said drum and shaft being provided with laterally arranged guideways adapted to permit the shifting of said drum crosswise with the shaft, a link for shifting said drum, said link being carried by a member arranged in the interior of said driving shaft and adjustable longitudinally thereof, said driving shaft being provided with a collar and a pin carrying said collar, and also with longitudinally extending slots in which said pin can move, a lever connected with said collar for shifting the same lengthwise of the shaft, arms provided with straps mounted upon said drum, rings surrounding said straps, and holding the same in position upon the drum, crank arms pivotally connected with said arms, said crank arms being mounted upon hollow rock shafts, gear wheels mounted upon said rock shafts, a pinion interposed between said gears and meshing with the same, said pinion being carried by a driven shaft, friction drive wheels mounted concentrically with said gears and confined in spaces in the same, there being two friction drive wheels in each gear, said friction drive wheels being provided with angular recesses containing friction balls, the recesses in the two wheels for each gear being oppositely arranged so that said friction drive wheels shall drive said gear in opposite directions, said friction drive wheels being also provided with clutch devices, longitudinally arranged members confined in said rock shafts and provided with clutch devices arranged to coöperate with the clutch devices on said friction drive wheels, said members being provided with extensions with projecting ends, springs tending to force said members in a direction to cause the engagement of clutch devices with one set of friction drive wheels, and a longitudinally movable rod or bar provided with projections for engaging said extensions and forcing the same in opposition to said springs so as to cause the engagement of the other clutch devices with the other set of friction drive wheels.

10. The combination of a rotary driving shaft provided with a transversely adjustable eccentric and transmission mechanism driven by said eccentric and comprising an arm oscillated by said eccentric, an oscillatory shaft actuated by said arm, a pair of oppositely-acting clutch-disks mounted on said oscillatory shaft, means for positively coupling either one of said clutch-disks to oscillate with said oscillatory shaft, a transmitting gear, a driven shaft in alinement with said driving shaft, and a pinion on said driven shaft actuated by said gear.

11. The combination of a rotary driving shaft provided with a transversely adjustable eccentric and transmitting mechanism comprising a pair of arms extending on opposite sides of said driving shaft and oscillated by said eccentric, a pair of counter-shafts actuated by said arms, a pair of oppositely acting clutch-disks mounted on each of said counter-shafts, means for positively coupling corresponding clutch-disks of each pair to oscillate with said counter-shafts, a transmitting gear journaled on each of said counter-shafts, clutch-rollers interposed between said gears and clutch-disks, whereby said gears may be driven in either direction, depending upon which clutch-disks are coupled to said counter-shafts, a driven shaft in axial alinement with said driving shaft, and a pinion on said driven shaft actuated by said gears.

In witness whereof, I hereunto subscribe my name this 17th day of June, A. D., 1915.

JOSEPH DE MARTINO.